No. 796,146. PATENTED AUG. 1, 1905.
L. PFINGST.
POWER BRAKE.
APPLICATION FILED OCT. 24, 1904.
2 SHEETS—SHEET 2.
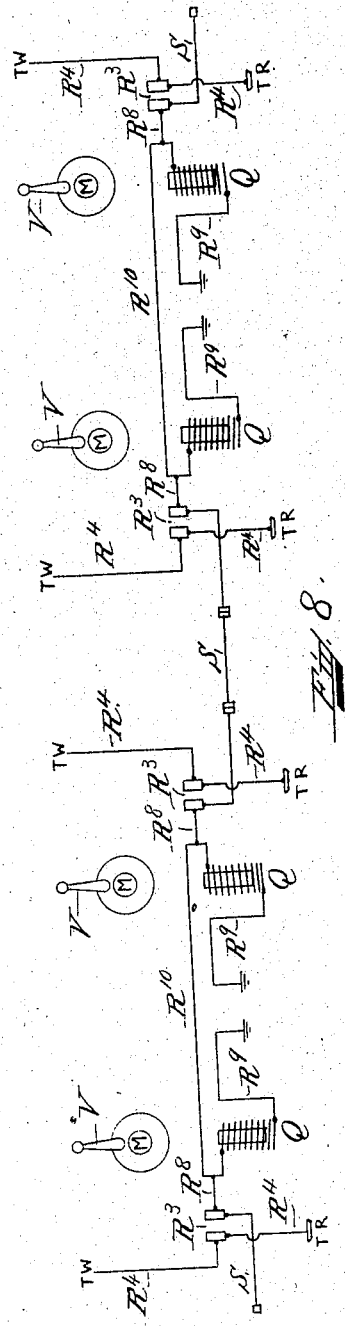

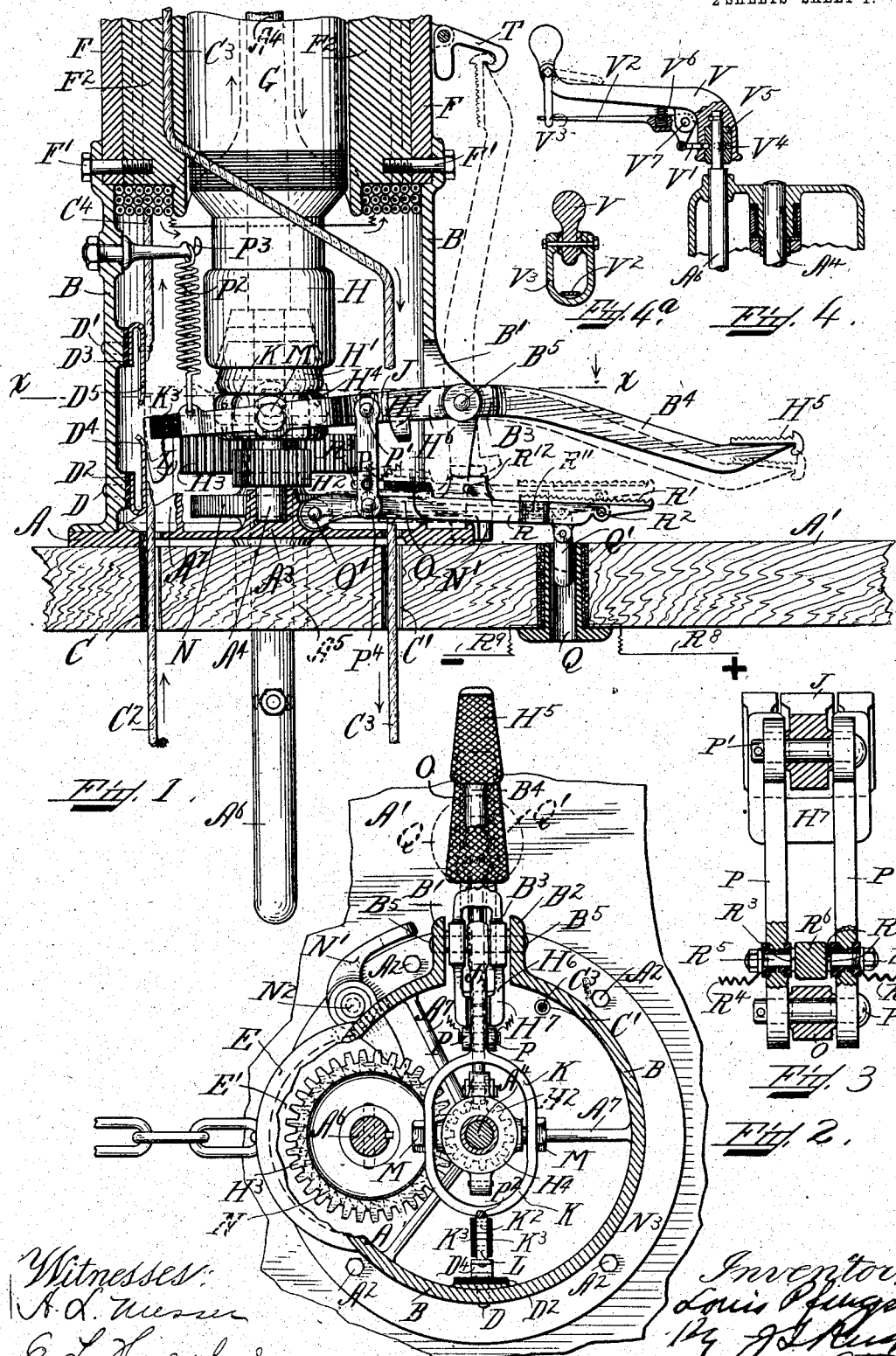

UNITED STATES PATENT OFFICE.

LOUIS PFINGST, OF BOSTON, MASSACHUSETTS, ASSIGNOR, BY MESNE ASSIGNMENTS, TO PFINGST ELECTRIC MANUFACTURING COMPANY, OF KITTERY, MAINE, A CORPORATION OF MAINE.

POWER-BRAKE.

No. 796,146.      Specification of Letters Patent.      Patented Aug. 1, 1905.

Application filed October 24, 1904. Serial No. 229,848.

*To all whom it may concern:*

Be it known that I, LOUIS PFINGST, of Boston, in the county of Suffolk and State of Massachusetts, have invented certain new and useful Improvements in Power-Brakes, of which the following is a specification.

My invention relates to improvements in automatic power-brakes, and especially to brakes which are applied by power from an electric motor transmitting its power to the chain-winding spindle of vehicles or cars, and is in the nature of an improvement on the power-brake shown and described in my application, filed July 13, 1904, Serial No. 216,339.

The object of my invention is to control the current flowing to the motor as well as to control the clutch interposed between the motor or shaft and the chain-winding spindle.

Another object is to produce mechanism for normally holding the clutch members out of engagement and also to control the circuit-closer and also to automatically cause the closing of the electric circuit and the engagement of the clutch members. These and other objects are accomplished by mechanism hereinafter described and shown.

My invention consists of certain novel features hereinafter described, and particularly pointed out in the claims.

In the accompanying drawings, which illustrate a construction embodying my invention, Figure 1 is an elevation, partly in section, of the lower part of the motor and the chain-winding spindle, showing the lever mechanism which operates the electric circuit and the clutch members. Fig. 2 is a horizontal cross-section on the line X X, Fig. 1, and looking in the direction indicated by the arrow. Fig. 3 is a detail view, partly in section, of the lever mechanism hereinafter described. Fig. 4 is a detail view in section of the brake-handle and chain-winding brake-spindle and motor armature-shaft. Fig. 4$^a$ is a detail sectional view through the knob of the handle and the link and lever which are pivoted thereon. Fig. 5 is a detail view of part of the foot-lever mechanism, showing the magnetic solenoid-circuit closer. Fig. 6 is a similar view showing the solenoid-circuit closed. Fig. 7 is a top plan view of the foot-lever mechanism. Fig. 8 is a diagrammatic view illustrating the solenoid-circuits for one or two cars. Fig. 9 is a diagrammatic view illustrating the motor-circuit for one or two cars.

Like letters of reference refer to like parts throughout the several views.

To the buffer-timber A' there is secured the bed-plate A, and secured to the bed-plate A by suitable bolts A$^2$ is the motor frame or support B.

B' and B$^2$ are brackets forming a support for the lever-fulcrum at B$^5$.

B$^3$ is an opening formed in the base-frame or motor-support to admit the levers B$^4$ and O for the operation of the clutch mechanism and the making and breaking of the electric circuit.

On the bed-plate A there is provided at its center the boss A$^3$ to form a guide or bearing for the lower end of the motor journal-shaft A$^4$, and adjacent there is also a bearing A$^5$ to support and guide the brake-spindle A$^6$.

A$^7$ represents ribs formed on the top side of the bed-plate A, connecting with the boss A$^3$.

C C' are suitable openings in the base-plate and platform-buffer to admit the electric conductors C$^2$ C$^3$.

The bolts A$^2$ secure the motor-frame B, bed-plate A, and platform-buffer A' together.

D D' are rivets passing through the motor-frame and the insulating-pieces D$^2$ D$^3$ to hold fast the contact-plates D$^4$ D$^5$, to which are connected the wires C$^2$ C$^4$.

E is a projection on the base-frame, forming a housing E' for the gear H$^3$, fast on the brake-spindle shaft A$^6$.

The motor-frame F is supported on the base-frame B, as shown, and held in place by the bolts F', which extend into the pole-pieces F$^2$ and hold same in an assembled position.

G is a motor-armature with extended shaft A$^4$, forming a journal in the bearing A$^3$.

On a portion of the lower armature journal-shaft A$^4$ is fixed the driving clutch member H, and below this member there is an idle or driven clutch member H', loosely surrounding and guided by the shaft A$^4$.

H$^2$ is a pinion-gear which is a part of the driven clutch member H' and mounted on the shaft A$^4$.

H$^4$ is a loosely-fitting ring for the clutch member H', so that the two clutch members can be engaged.

H$^5$ is the tread of the long end of the foot-lever B⁴, and H⁶ is the short end, bifurcated and bridged on its under side by the piece H⁷.

The lever B⁴ is fulcrumed on the pin B⁵, and said pin is supported by the brackets B' and B².

J is an extension-arm pivoted loosely on the pin B⁵ and resting on the bridging-piece H⁷ and passing between the bifurcated arms H⁶. The arm J at or near its center separates, forming two arms K K', which unite again at the rear with the projecting piece K², to which the insulating-bars K³ are attached. These bars K³ prevent the current from running into the other parts of the apparatus when the contact-finger L is in contact with the plates D⁴ D⁵. The finger L is attached to the insulating-bars K³, and at the centers of said double arm there are holes which permit the tapped bolts M to pass through and be secured into opposite sides of the clutch-ring H⁴, thereby forming a pair of trunnions, so that the clutch member H' can be brought into contact with the clutch member H.

On the spindle A⁶ and attached thereto there is a ratchet-wheel N, and resting on the bed-plate A and coöperating with said ratchet-wheel N is a pawl N', pivoted on the pin N². This pawl N' rests on the flange N³ of the base-frame A. The gear H³ meshes with the pinion H², from which the power of the motor is transmitted to the chain-winding spindle A⁶ when the clutch members are connected and the circuit closed.

The lower lever O is pivoted at its rear end to brackets on the base-plate A, and near its rear end at P⁴ there is pivoted thereto the link P, pivoted at its upper end on the arm J at P', forming a fulcrum on the lever O.

The spring P² has its upper end connected to the bracket P³ and its lower end to the piece K² of the arm J, and the object of this spring is to exert a pull on the rear end of the arm J to raise the contact-finger L and close the circuit between the contact-pieces D⁴ D⁵ and at the same time to raise the clutch member H' into fixed engagement with the driving clutch member H.

Located in the buffer-timber A' is a magnetic solenoid Q, with which coöperates the solenoid-core Q', pivoted on the under side of the lever O. The lever O may be operated by the foot of the operator holding it down or by the magnetic influence of the solenoid, and in either case the clutches are held out of engagement and the motor-circuit cut out with the parts in the position shown in Fig. 1.

On the lever O there is pivoted the lever R at R² and having a tread R', which extends on each side of said pivot R². The purpose of the lever R is to act as a circuit-closing lever when the operator places his foot on the inner part of the tread beyond the pivot R² and by this pressure closes the switch R³, which will permit the current to flow through the wire R⁴ from the source of supply, through the bolt R⁵, (suitably insulated from the link P, shown in Fig. 3,) and the current then flows to the insulated part R⁶ of the lever R, thence through the bolt R⁷ (suitably insulated from the link P) and out through the wire R⁸ to the magnetic solenoid Q, and from the magnetic solenoid out through the wire R⁹ to the ground. This solenoid when energized pulls down the solenoid-core Q', operating the lever O, thus pulling on the link P, which will act on the arm J, disengaging the clutch members H H' and cutting out the motor-circuit between the contact members D⁴ D⁵, which operation will release the brakes by the brake-spring pull.

It will be understood that without the magnetic solenoid energizing the solenoid Q, the operator can set or release the brakes on a single car in the following manner: To release the brakes, the operator presses on the outer part of the tread R' of the lever R, which will come in contact with the lever O, which will act on the links P and pull down the arm J, thus disengaging the clutch members and breaking the circuit and releasing the brakes. To set the brakes, the operator releases the pressure on the inner part of the tread R', which releases the pressure on the lever O, links P, and the arm J, which will bring the finger L into contact with the contact-plate D⁵, thereby closing the circuit, and the motor will rotate before the clutches become engaged. A further release of the pressure will permit the spring P² to cause the engagement of the clutch members H H', when the rotation of the motor will be communicated to the chain-winding spindle A⁶ by the mechanism previously described.

In the diagrammatic views, Figs. 8 and 9, there are shown a plurality of magnetic solenoids and motors in circuit for train service, and the constructions shown in Figs. 1 to 7 are embodied in the braking apparatus on each end of the cars in the train. To operate the two motors on one car or more in the train, the switch R³ is operated as previously described by the operator to close the circuit through the magnetic solenoids Q, and the current passes by the wires R⁹ to the ground. The continuation of the circuit to the next car is through the wire R¹⁰ and coupling connection S, thence to the next car connected with the wires R⁸ and R¹⁰, through the magnetic solenoids, and thence to the wires R⁹ to the ground. In this manner the operation of the apparatus by the operator at the head of or on any car in the train applies or releases the brakes through the entire train by means of the electromagnetic circuit in a manner similar to that previously described for one car— that is, by closing the motor-circuit and engaging the clutch members, and vice versa. Instead of taking the current from the trolley-wire it can be taken from the third rail, the trolley-wire and third rail being marked, respectively, TW and TR, or may be taken from any other source.

In the diagrammatic view Fig. 9 the wiring of the motor-circuit is illustrated for one or a plurality of cars. The current entering through $C^2$ from the trolley-wire or third rail will pass to the motor when the circuit-closer L is closed, as hereinbefore described, and from the motor out to the ground through the wire $C^3$. Part of the circuit passes through the wire U and enters the motor through the wire $U'$ and then passes to the ground through the wire $C^3$, thus operating both motors on the same car. If there is a train of cars—say two—part of the current just described passes by the coupling $U^2$ to the wire U of the next car, down through the wire $U'$ into the motor, and from the motor to the ground through the wire $C^3$. At the same time part of the current passes by the wire U to the wire $U'$ and then to the motor on the opposite end of the second car and out to the ground through the wire $C^3$. In this manner the motor-circuit operates as one throughout the train. By deënergizing the magnetic solenoid-circuits of the train, the motor-circuits are closed and the clutch-members are engaged by the pull of the spring $P^2$. By this arrangement the brakes on all of the cars will be set simultaneously. To release the brakes, the magnetic solenoid-circuit is energized, which will pull on the lever O, thence on the links P, arm J, and break the motor-circuit and disengage the clutch members throughout the train.

Figs. 8 and 9 show a plurality of solenoids, motors, and hand-power brake-handles.

$R^{11}$ is a spring resting in a pocket formed on the lever O for the purpose of lifting the inner end of the lever R when the pressure of the operator is relieved from the tread $R'$, bringing the inner end of the lever R up against the pin $R^{12}$ and breaking the magnetic solenoid-circuit. Should the spring $R^{11}$ become inoperative, the operator can place his foot on the outer end of the tread $R'$, which will answer the same purpose—that is, break the magnetic solenoid-circuit by lifting the inner end of the lever R, which, as previously described, takes place when it is desired to apply the brakes.

On the upper end of the chain-winding brake-spindle $A^6$ (see Figs. 4 and $4^a$) there is located a brake-handle V, in which the upper end of the brake-spindle is free to revolve, so that the spindles can rotate freely without rotating the handles, and when it is desired the handles can be engaged with the spindles. This arrangement is carried out by the lever $V^2$ being held upward by the link $V^3$, which arrangement holds the pin $V'$ out of engagement with the orifices $V^4$ of the hub $V^5$ of the spindle $A^6$. In order to allow the handle V to engage the spindle $A^6$, the operator swings the link $V^3$ outwardly and up over the knob of the handle resting on the top of the handle V. When this link is thrown as described, the spring $V^6$ forces the lever $V^2$ downwardly, causing the pin $V'$ to enter into engagement with one of the orifices $V^4$ of the hub $V^5$ of the spindle $A^6$. The spring $V^6$ acts to hold the pin $V'$ when it is engaged with the hub $V^5$ when operating with the handle. This lever $V^2$ is pivoted on the bracket $V^7$.

The lever $B^4$ is an auxiliary lever which may be used to close the circuit and engage the clutches in case the spring $P^2$ should become inoperative. It also acts as a lock for the lever mechanism on either end of the car when not in use and can be moved to the position shown in dotted lines, Fig. 1, and held by the catch T and prevents the closing of the circuit or the engagement of the clutch members. The advantage of this mechanism is that it forms an automatic brake-setting appliance, so that in case of accident to the motorman or in case he should desert his car for any reason the brakes will be automatically set.

The magnetic solenoid-circuit switches or current-controllers on the cars in the train-circuit can be operated on any of the cars in the train to operate the motor-circuits and to engage the clutch mechanism to apply the brakes, as appears from the description. The magnetic solenoid-circuit can be operated on any car in the train by operating the lever R to close the switch $R^3$, which will break the motor-circuits and disengage the clutch members throughout the train to release the brakes, as fully disclosed in the specification.

Having thus described the nature of my invention and set forth a construction embodying the same, what I claim as new, and desire to secure by Letters Patent of the United States, is—

1. In an apparatus of the character described, a motor-clutch and gear-driven brake-spindle, an electric motor, a rotatable electric-motor armature-shaft, and automatic means for transmitting power from said rotating armature-shaft for rotating said spindle.

2. In an apparatus of the character described, a motor-clutch and gear-driven brake-spindle, an electric motor, a rotatable electric-motor armature-shaft, and automatic means for engaging the clutch mechanism to transmit power from said rotating armature-shaft for rotating said spindle.

3. In an apparatus of the character described, a motor-clutch and gear-driven brake-spindle, an electric motor, a rotatable electric-motor armature-shaft, and automatic means for engaging said clutch mechanism and for transmitting power from said rotating armature-shaft and for rotating said spindle.

4. In an apparatus of the character described, a chain-winding brake-spindle, an electric motor, a rotatable motor armature-shaft, and automatic means for closing the motor-circuit to apply the brakes, 5. In an apparatus of the character described, a chain-winding brake-spindle, an electric motor, a rotatable motor armature-shaft, and automatic means for closing the circuit to transmit power from said rotating armature-shaft to said spindle.

6. In an apparatus of the character described, a chain-winding brake-spindle, an electric motor, a rotatable motor armature-shaft, clutch mechanism for engaging said spindle and armature-shaft, and automatic means for closing the circuit through the motor and actuating said clutch mechanism to apply the brakes.

7. In an apparatus of the character described, a chain-winding brake-spindle, an electric motor, a rotatable motor armature-shaft, and automatic means for closing the motor-circuit to apply the brakes, and means for preventing the operation of said automatic means.

8. In an apparatus of the character described, a chain-winding brake-spindle, an electric motor, a rotatable motor armature-shaft, automatic means for closing the circuit to transmit power from said rotating armature-shaft to said spindle, and means for preventing the operation of said automatic means.

9. In an apparatus of the character described, a chain-winding brake-spindle, an electric motor, a rotatable motor armature-shaft, automatic means for closing the motor-circuit to apply the brakes, and a lever for normally preventing the operation of said automatic means.

10. In an apparatus of the character described, a chain-winding brake-spindle, an electric motor, a rotatable motor armature-shaft, automatic means for closing the motor-circuit to apply the brakes, a lever for normally preventing the operation of said automatic means, and a magnetic solenoid adapted to control the movements of said lever.

11. In an apparatus of the character described, a chain-winding brake-spindle, an electric motor, a rotatable motor armature-shaft, automatic means for closing the motor-circuit to apply the brakes, and auxiliary means for closing the circuit to apply the brakes.

12. In an apparatus of the character described, a chain-winding brake-spindle, an electric motor, a rotatable motor armature-shaft, clutch mechanism for engaging said spindle and armature-shaft, automatic means for closing the circuit through the motor and actuating said clutch mechanism to apply the brakes, and auxiliary means for closing the circuit and engaging the clutch mechanism for applying the brakes.

13. In an apparatus of the character described, a chain-winding brake-spindle, an electric motor, a rotatable motor armature-shaft, automatic means for closing the motor-circuit to apply the brakes, and a magnetic solenoid adapted to control said automatic means.

14. In an apparatus of the character described, a chain-winding brake-spindle, an electric motor, a rotatable motor armature-shaft, automatic means for closing the motor-circuit to apply the brakes, and an electric circuit for controlling said automatic means.

15. In an apparatus of the character described, a plurality of chain-winding brake-spindles, a plurality of electric motors, a plurality of electric-motor armature-shafts, automatic means for closing the motor-circuits to apply the brakes, and an electric circuit for controlling said automatic means.

16. In an apparatus of the character described, a plurality of chain-winding brake-spindles, a plurality of electric motors, a plurality of electric-motor armature-shafts, automatic means for closing the motor-circuits to apply the brakes, and an electromagnetic solenoid-circuit for controlling said automatic means.

17. In an apparatus of the character described, a plurality of chain-winding brake-spindles, a plurality of electric motors, a plurality of rotatable electric-motor armature-shafts, a plurality of clutch mechanisms for transmitting power from said motors to said spindles, automatic means for closing the motor-circuits to apply the brakes, and an electric circuit for operating said clutch mechanisms.

18. In an apparatus of the character described, a plurality of chain-winding brake-spindles, a plurality of electric motors, a plurality of rotatable electric-motor armature-shafts, a plurality of clutch mechanisms for transmitting power from said motors to said spindles, automatic means for closing the motor-circuits to apply the brakes, and an electric circuit for operating said clutch mechanisms and said automatic means.

19. In an apparatus of the character described, a motor-clutch and gear-driven brake-spindle, an electric motor, a rotatable electric-motor armature-shaft, automatic means for transmitting power from said rotating armature-shaft for rotating said spindle, and an auxiliary lever independent of said automatic means for closing the motor-circuit.

20. In an apparatus of the character described, a motor-clutch and gear-driven brake-spindle, an electric motor, a rotatable electric-motor armature-shaft, automatic means for transmitting power from said rotating armature-shaft for rotating said spindle, and an auxiliary lever independent of said automatic means for closing said motor-circuit and engaging the clutches.

21. In an apparatus of the character described, a motor-clutch and gear-driven brake-spindle, an electric motor, a rotatable electric-motor armature-shaft, automatic means for transmitting power from said rotating armature-shaft for rotating said spindle, and an auxiliary lever independent of said automatic means for closing said motor-circuit and the clutches and adapted to be moved into position to lock said automatic means against movement.

22. In an apparatus of the character described, a motor-clutch and gear-driven brake-spindle, an electric motor, a rotatable electric-motor armature-shaft, automatic means for transmitting power from said rotating armature-shaft for rotating said spindle, and a brake-handle capable of engagement with and disengagement from said spindle.

23. In an apparatus of the character described, a motor-clutch and gear-driven brake-spindle, an electric motor, a rotatable electric-motor armature-shaft, automatic means for engaging the clutch mechanism to transmit power from said rotating armature-shaft for rotating said spindle, and a brake-handle capable of engagement with and disengagement from said spindle.

24. In an apparatus of the character described, a motor-clutch and gear-driven brake-spindle, an electric motor, a rotatable electric-motor armature-shaft, automatic means for engaging said clutch mechanism and for transmitting power from said rotating armature-shaft and for rotating said spindle, and a brake-handle capable of engagement with and disengagement from said spindle.

25. In an apparatus of the character described, a chain-winding brake-spindle, an electric motor, a rotatable motor armature-shaft, automatic means for closing the motor-circuit to apply the brakes, and a brake-handle capable of engagement with and disengagement from said spindle.

26. In an apparatus of the character described, a chain-winding brake-spindle, an electric motor, a rotatable motor armature-shaft, automatic means for closing the circuit to transmit power from said rotating armature-shaft to said spindle, and a brake-handle capable of engagement with and disengagement from said spindle.

27. In an apparatus of the character described, a chain-winding brake-spindle, an electric motor, a rotatable motor armature-shaft, clutch mechanism for engaging said spindle and armature-shaft, automatic means for closing the circuit through the motor and actuating said clutch mechanism to apply the brakes, and a brake-handle capable of engagement with and disengagement from said spindle.

28. In an apparatus of the character described, a chain-winding brake-spindle, an electric motor, a rotatable motor armature-shaft, automatic means for closing the motor-circuit to apply the brakes, means for preventing the operation of said automatic means, and a brake-handle capable of engagement with and disengagement from said spindle.

29. In an apparatus of the character described, a chain-winding brake-spindle, an electric motor, a rotatable motor armature-shaft, automatic means for closing the circuit to transmit power from said rotating armature-shaft to said spindle, means for preventing the operation of said automatic means, and a brake-handle capable of engagement with and disengagement from said spindle.

30. In an apparatus of the character described, a chain-winding brake-spindle, an electric motor, a rotatable motor armature-shaft, automatic means for closing the motor-circuit to apply the brakes, a lever for normally preventing the operation of said automatic means, and a brake-handle capable of engagement with and disengagement from said spindle.

31. In an apparatus of the character described, a chain-winding brake-spindle, an electric motor, a rotatable motor armature-shaft, automatic means for closing the motor-circuit to apply the brakes, a lever for normally preventing the operation of said automatic means, a magnetic solenoid adapted to control the movements of said lever, and a brake-handle capable of engagement with and disengagement from said spindle.

32. In an apparatus of the character described, a chain-winding brake-spindle, an electric motor, a rotatable motor armature-shaft, automatic means for closing the motor-circuit to apply the brakes, auxiliary means for closing the circuit to apply the brakes, and a brake-handle capable of engagement with and disengagement from said spindle.

33. In an apparatus of the character described, a chain-winding brake-spindle, an electric motor, a rotatable motor armature-shaft, clutch mechanism for engaging said spindle and armature-shaft, automatic means for closing the circuit through the motor and actuating said clutch mechanism to apply the brakes, auxiliary means for closing the circuit and engaging the clutch mechanism for applying the brakes, and a brake-handle capable of engagement with and disengagement from said spindle.

34. In an apparatus of the character described, a chain-winding brake-spindle, an electric motor, a rotatable motor armature-shaft, automatic means for closing the motor-circuit to apply the brakes, a magnetic solenoid adapted to control said automatic means, and a brake-handle capable of engagement with and disengagement from said spindle.

35. In an apparatus of the character described, a chain-winding brake-spindle, an electric motor, a rotatable motor armature-shaft, automatic means for closing the motor-circuit to apply the brakes, an electric circuit for controlling said automatic means, and a brake-handle capable of engagement with and disengagement from said spindle.

36. In an apparatus of the character described, a plurality of chain-winding brake-spindles, a plurality of electric motors, a plurality of electric-motor armature-shafts, automatic means for closing the motor-circuits to apply the brakes, an electric circuit for controlling said automatic means, and a brake-handle capable of engagement with and disengagement from each of said spindles.

37. In an apparatus of the character described, a plurality of chain-winding brake-spindles, a plurality of electric motors, a plurality of electric-motor armature-shafts, automatic means for closing the motor-circuits to apply the brakes, an electric magnetic solenoid-circuit for controlling said automatic means, and a brake-handle capable of engagement with and disengagement from each of said spindles.

38. In an apparatus of the character described, a plurality of chain-winding brake-spindles, a plurality of electric motors, a plurality of rotatable electric-motor armature-shafts, a plurality of clutch mechanisms for transmitting power from said motors to said spindles, automatic means for closing the motor-circuits to apply the brakes, an electric circuit for controlling said clutch mechanisms, and a brake-handle capable of engagement with and disengagement from each of said spindles.

39. In an apparatus of the character described, a plurality of chain-winding brake-spindles, a plurality of electric motors, a plurality of rotatable electric-motor armature-shafts, a plurality of clutch mechanisms for transmitting power from said motors to said spindles, automatic means for closing the motor-circuits to apply the brakes, an electric circuit for operating said clutch mechanisms and said automatic means, and a brake-handle capable of engagement with and disengagement from each of said spindles.

40. In an apparatus of the character described, a chain-winding brake-spindle, an electric motor, a rotatable motor armature-shaft, and means for closing the motor-circuit to apply the brakes, brake-handle capable of engagement with and disengagement from said spindle, and means for normally preventing the engagement of said handle and said spindle.

41. In an apparatus of the character described, a chain-winding brake-spindle, an electric motor, a rotatable motor armature-shaft, means for closing the motor-circuit to apply the brakes, a brake-handle capable of engagement with and disengagement from said spindle, means for normally preventing the engagement of said handle and said spindle, and means for holding said handle in engagement with said spindle upon the engagement of said handle with said spindle.

42. In an apparatus of the character described, a chain-winding brake-spindle, an electric motor, a rotatable motor armature-shaft, means for closing the motor-circuit to apply the brakes, a brake-handle capable of engagement with and disengagement from said spindle, means for normally preventing the engagement of said handle and said spindle, and yielding means for holding said handle in engagement with said spindle upon the engagement of said handle with said spindle.

43. In an apparatus of the character described, a motor-clutch and gear-driven brake-spindle, an electric motor, a rotatable electric-motor armature-shaft, automatic means for closing the motor-circuit to rotate said armature-shaft, and automatic means for transmitting power from said armature-shaft to said brake-spindle for rotating said spindle.

44. In an apparatus of the character described, a motor-clutch and gear-driven brake-spindle, an electric motor, a rotatable electric-motor armature-shaft, means for closing the motor-circuit to rotate said armature-shaft, and automatic means for transmitting power from said armature-shaft to said brake-spindle for rotating said spindle.

45. In an apparatus of the character described, a motor-clutch and gear-driven brake-spindle, an electric motor, a rotatable electric-motor armature-shaft, automatic means for closing the motor-circuit to rotate said armature-shaft, and means for transmitting power from said armature-shaft to said brake-spindle for rotating said spindle.

46. In an apparatus of the character described, a motor-clutch and gear-driven brake-spindle, an electric motor, a rotatable electric-motor armature-shaft, clutch mechanism for transmitting power from said motor to said spindle, automatic means for closing the motor-circuit, and automatic means for engaging said clutch mechanism to transmit power from said motor to said brake-spindle.

47. In an apparatus of the character described, a motor-clutch and gear-driven brake-spindle, an electric motor, a rotatable electric-motor armature-shaft, clutch mechanism for transmitting power from said motor to said spindle, means for closing the motor-circuit, and automatic means for engaging said clutch mechanism to transmit power from said motor to said brake-spindle.

48. In an apparatus of the character described, a motor-clutch and gear-driven brake-spindle, an electric motor, a rotatable electric-motor armature-shaft, clutch mechanism for transmitting power from said motor to said spindle, automatic means for closing the motor-circuit, and means for engaging said clutch mechanism to transmit power from said motor to said brake-spindle.

49. In an apparatus of the character described, a chain-winding brake-spindle, an electric motor, a rotatable motor armature-shaft, automatic means for closing the motor-circuit to rotate said armature-shaft, and automatic means for transmitting power from said armature-shaft to said spindle.

50. In an apparatus of the character described, a chain-winding brake-spindle, an electric motor, a rotatable motor armature-shaft, means for closing the motor-circuit to rotate said armature-shaft, and automatic means for transmitting power from said armature-shaft to said spindle.

51. In an apparatus of the character described, a chain-winding brake-spindle, an electric motor, a rotatable motor armature-shaft, automatic means for closing the motor-circuit to rotate said armature-shaft, and means for transmitting power from said armature-shaft to said spindle.

In testimony whereof I have signed my name to this specification, in the presence of two subscribing witnesses, this 10th day of October, A. D. 1904.

LOUIS PFINGST.

Witnesses:
   A. L. Messer,
   A. R. Larrabee.